US009262329B2

(12) United States Patent
Olin et al.

(10) Patent No.: US 9,262,329 B2
(45) Date of Patent: Feb. 16, 2016

(54) SNAPSHOT ACCESS (75) Inventors: Marc David Olin, Edina, MN (US);
Michael James Klemm, Minnetonka, MN (US); Ranjit Pandit, Portland, OR (US)

(73) Assignee: DELL PRODUCTS L.P., Round Rock, TX (US)

( * ) Notice: Subject to any disclaimer, the term of this patent is extended or adjusted under 35 U.S.C. 154(b) by 41 days.

(21) Appl. No.: 13/593,865

(22) Filed: Aug. 24, 2012

(65) Prior Publication Data
US 2014/0059300 A1    Feb. 27, 2014

(51) Int. Cl.
| G06F 12/00 | (2006.01) |
| G06F 12/08 | (2006.01) |
| G06F 12/16 | (2006.01) |
| G06F 11/00 | (2006.01) |
| G06F 3/06  | (2006.01) |
| G06F 11/20 | (2006.01) |

(52) U.S. Cl.
CPC ............ *G06F 12/0866* (2013.01); *G06F 3/065* (2013.01); *G06F 3/067* (2013.01); *G06F 3/0619* (2013.01); *G06F 11/00* (2013.01); *G06F 12/16* (2013.01); *G06F 11/2046* (2013.01)

(58) Field of Classification Search
CPC ............ G06F 12/0831; G06F 12/0804; G06F 12/0817
USPC .......................................................... 711/142
See application file for complete search history.

(56) References Cited

U.S. PATENT DOCUMENTS

| 6,647,473 | B1 | 11/2003 | Golds et al. ................... 711/161 |
| 7,359,975 | B2 | 4/2008 | Martin et al. ................. 709/228 |
| 2003/0140193 | A1* | 7/2003 | Acharya et al. ............... 711/112 |
| 2003/0172229 | A1* | 9/2003 | Takasugi et al. .............. 711/112 |
| 2004/0078636 | A1 | 4/2004 | Suzaki ............................. 714/6 |
| 2004/0243834 | A1* | 12/2004 | Stefik et al. ................... 713/200 |
| 2005/0240938 | A1* | 10/2005 | Lane ............................. 719/310 |
| 2006/0221393 | A1* | 10/2006 | Takaki ......................... 358/1.16 |
| 2007/0239944 | A1* | 10/2007 | Rupanagunta et al. ....... 711/147 |
| 2007/0260846 | A1* | 11/2007 | Burton .......................... 711/216 |
| 2008/0209146 | A1 | 8/2008 | Imazu et al. .................. 711/162 |
| 2010/0077142 | A1 | 3/2010 | Fienblit et al. ................ 711/118 |
| 2010/0241726 | A1 | 9/2010 | Wu ............................... 709/217 |
| 2010/0332401 | A1* | 12/2010 | Prahlad et al. .................. 705/80 |
| 2012/0011336 | A1* | 1/2012 | Saika ............................ 711/162 |
| 2012/0124294 | A1 | 5/2012 | Atkisson et al. ............. 711/135 |
| 2013/0054530 | A1* | 2/2013 | Baker et al. ................... 707/639 |
| 2013/0238572 | A1 | 9/2013 | Prahlad et al. ................ 707/692 |
| 2014/0059298 | A1 | 2/2014 | Olin et al. ..................... 711/135 |

OTHER PUBLICATIONS

Non-Final Office Action issued in U.S. Appl. No. 13/593,822; 16 pages, Feb. 12, 2015.
Final Office Action issued in U.S. Appl. No. 13/593,822; 18 pages, Sep. 15, 2014.
Non-Final Office Action issued in U.S. Appl. No. 13/593,822; 15 pages, May 7, 2014.

* cited by examiner

*Primary Examiner* — Charles Rones
*Assistant Examiner* — Nanci Wong
(74) *Attorney, Agent, or Firm* — Baker Botts L.L.P.

(57) ABSTRACT

In one embodiment, a method performed by one or more computing devices includes receiving at a host cache a first request for data comprising at least one snapshot of a cached logical unit number (LUN), sending, by the host cache, the data comprising at least one snapshot of the cached LUN in response to the first request, and in response to the completing sending the data comprising at least one snapshot of the cached LUN, sending, by the host cache, a first response indicating that sending the data is complete.

20 Claims, 8 Drawing Sheets

SNAPSHOT ACCESS

TECHNICAL FIELD

This disclosure generally relates to data storage and storage administration and more specifically the functionality of storage area networks with respect to caching.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. There are continuous efforts to improve data storage and storage administration. Sharing storage, such as with a storage area network (SAN) may simplify storage administration because cables and storage devices do not have to be physically moved for storage to be made accessible to a remote computing system, such as a server. Servers may boot from the SAN itself, which allows for more efficient replacement of faulty servers by transferring the logical unit number (LUN) of the faulty server to another server. SANs also tend to enable more effective disaster recovery processes. A SAN could span storage arrays in multiple, physically distant locations. And SANs may provide storage replication implemented by disk array controllers, by server software, or by specialized SAN devices.

DESCRIPTION OF EXAMPLE EMBODIMENTS

This disclosure generally relates to data storage and storage administration and more specifically the functionality of storage area networks with respect to caching.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Some information handling systems are designed to interact with other information handling systems over a network connection. There are continuous efforts to improve data storage and storage administration. Sharing storage, such as with a storage area network (SAN) may simplify storage administration because cables and storage devices do not have to be physically moved for storage to be made accessible to a remote computing system, such as a server. Servers may boot from the SAN itself, which allows for more efficient replacement of faulty servers by transferring the logical unit number (LUN) of the faulty server to another server. SANs also tend to enable more effective disaster recovery processes. A SAN may be referred to as a SAN array. A SAN could span storage arrays in multiple, physically distant locations. And SANs may provide storage replication implemented by disk array controllers, by server software, or by specialized SAN devices.

Figure 1:
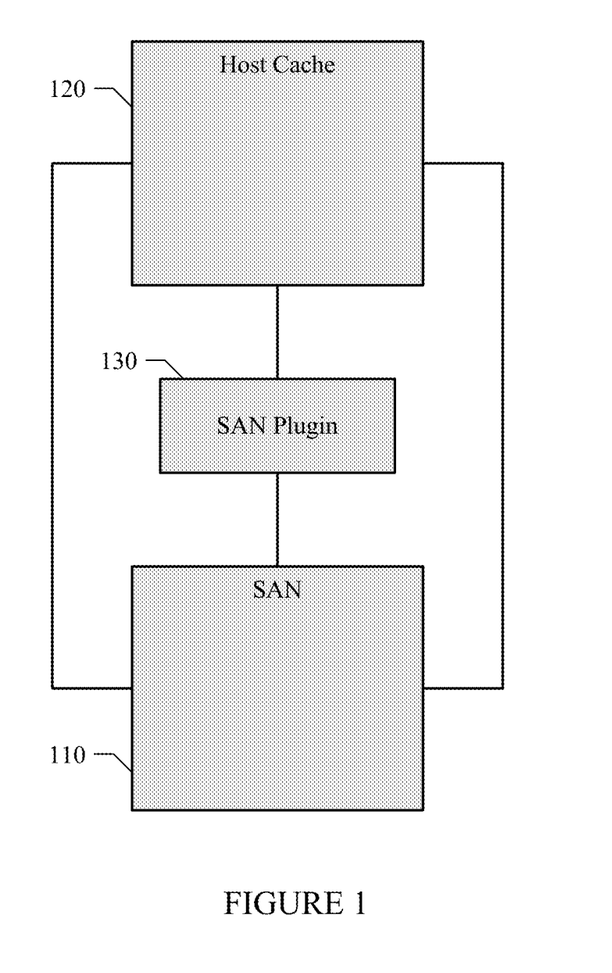
FIG. 1 illustrates an example storage area network (SAN) system for coordinating the creation and access of a snapshot.

FIG. 1 illustrates an example storage area network (SAN) system for coordinating the creation and access of a snapshot by the SAN. In particular embodiments, a snapshot may be a data structure that represents data as it exists at a particular time. In particular embodiments, a SAN may coordinates the creation and access of a snapshot so that snapshots are not stored in the cache. The illustrated embodiment of a SAN system may include SAN 110, a host cache 120, and a SAN plugin 130.

A generic SAN, such as SAN 110, refers to a SAN and its management components. A SAN may include a dedicated network that provides access to consolidated block-level data storage, and it may be deployed in any number of ways that implement basic functionality. Certain SANs may incorporate additional functionality, such as an array, SAN Management applications, and server drivers. The SAN may control connectivity to the host cache for cached LUNs, and it is aware of usage of the host cache for each LUN. Specific SAN implementations may choose to coordinate the actions to support connectivity and snapshots within the management interface.

SANs such as SAN 110 may have a management interface. A management interface may initiate many of the high level requests to add or remove servers, create or remove LUNs, take snapshots, provide connectivity to snapshots, and so on, that launch the backend integration request handling. The launching of the high level requests, the management breakdown of a user interface (UI), the scripting interfaces, and the server OS integrations function within the management interface. A direct UI and user presentation may be done through the SAN, as opposed to the host cache. The SAN manages the LUN at the top of the host cache where it is presented to the OS application. The SAN management interface is responsible for this presentation.

SAN 110 may have a SAN array. A SAN array handles input-output (I/O) traffic and backend data storage. The SAN array may also handle control plane tasks related to connectivity and snapshots. The SAN array provides hardware architecture protection in order to maximize up time. In particular embodiments, the SAN array may contain software map-zone connectivity control that allows LUNs or volumes to be presented to specific servers on the network. In particular embodiments the SAN array implements snapshot functionality for LUNs or volumes that may be integrated in to the host cache.

SAN 110 may includes server (host) drivers to manage the I/O path and integrate with the server OS. In particular embodiments, these drivers may participate in host cache control plane operations such as connectivity and snapshots In the embodiment illustrated in FIG. 1, SAN 110 may communicate with the host cache 120. In particular embodiments, the host cache 120 implements a virtual IP address for control plane requests from SAN 110 to the host cache 120. This interface is also used by the management API for the host cache 120. In particular embodiments, SAN 110 implements a virtual IP address for control requests sent from host cache to SAN. In particular embodiments, snapshot processing requires request messages, which will be discussed later.

In the embodiment illustrated in FIG. 1, SAN 110 and the host cache 120 are able to communicate with a SAN plugin 130. The SAN plugin 130 improves management of the interaction between SAN 110 and the host cache 120. The SAN plugin 130 may integrate the SAN and the host cache into the rest of the information technology environment managed by one or more software components. The SAN plugin 130 may monitor SAN events, processes, and services, and may intercept filters and prioritize storage events. The SAN plugin 130 may incorporate one or more applications that start or stop certain SAN functions, collect data relating to communications between SAN 110 and the host cache 120, or provide service mapping integration.

Particular embodiments may include various combinations of host cache 120 and SAN 110 systems for maximum flexibility. A SAN may service backend storage for multiple host cache clusters ("HCCs"). The SAN assumes each HCC is unaware of the operation and status of the others. An HCC may communicate with multiple SANs simultaneously, though each SAN may be unaware of the operation and status of the others. A SAN LUN may move between SAN instances in a non-service-affecting manner. This should not affect host cache operation except to the sending of flush complete messages. In particular embodiments, internal host cache operation and status does not affect SAN operation, except for in the case of a LUN outage.

Figure 2:
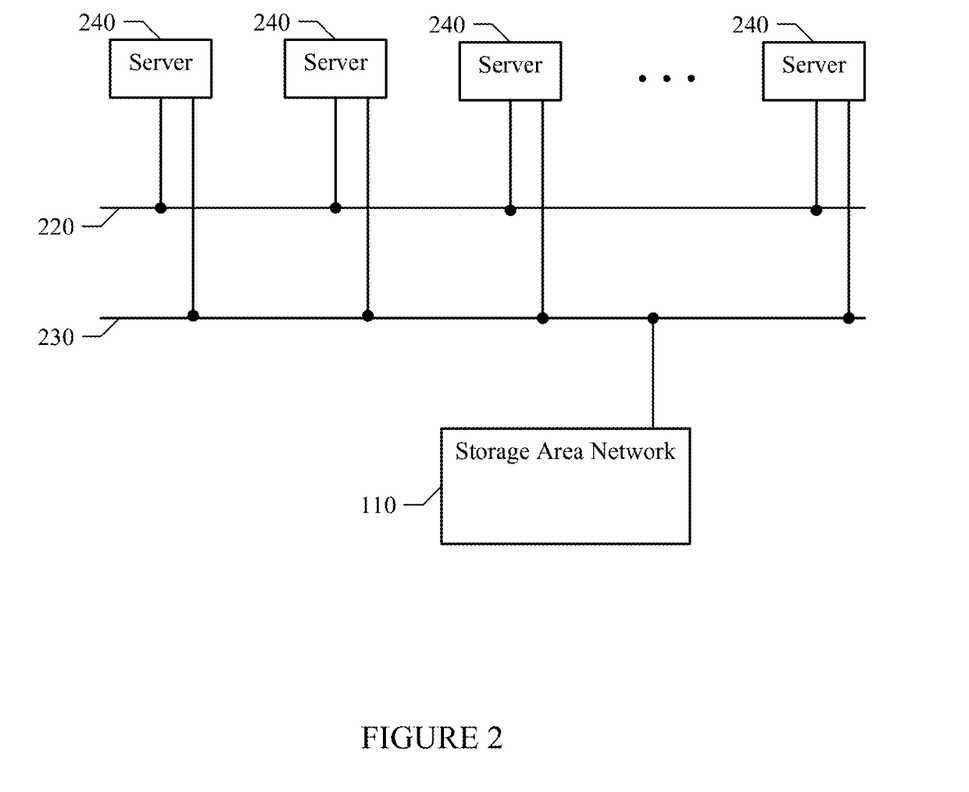
FIG. 2 illustrates another example SAN system including a network element.

FIG. 2 illustrates a more detailed SAN system comprising SAN 110, a cache network 220, a storage network 230, and one or more servers 240 that include the host cache. The host cache refers to the overall package of hardware and software components that make up the caching infrastructure. The host cache contains servers 240 that have flash devices.

A SAN typically uses a data network to interconnect the SAN with the host cache, and interconnect the host cache itself. Cache network 220 and storage network 230 utilize a data network. The data network may be any type of transport, such as Fibre Channel (FC), Internet Small Computer System Interface (iSCSI), Fibre Channel over Ethernet (FCoE), Fibre Channel over IP (FCIP), and Infiniband. The data network may have multipath capability. The SAN and server OS may have multipath capability. Control plane requests between the SAN and the host cache may be made through transmission control protocol-internet protocol (TCP/IP). In particular embodiments, non-data network communications between SAN and the host cache are used to manage connectivity and coordinate snapshot requests.

Figure 3:
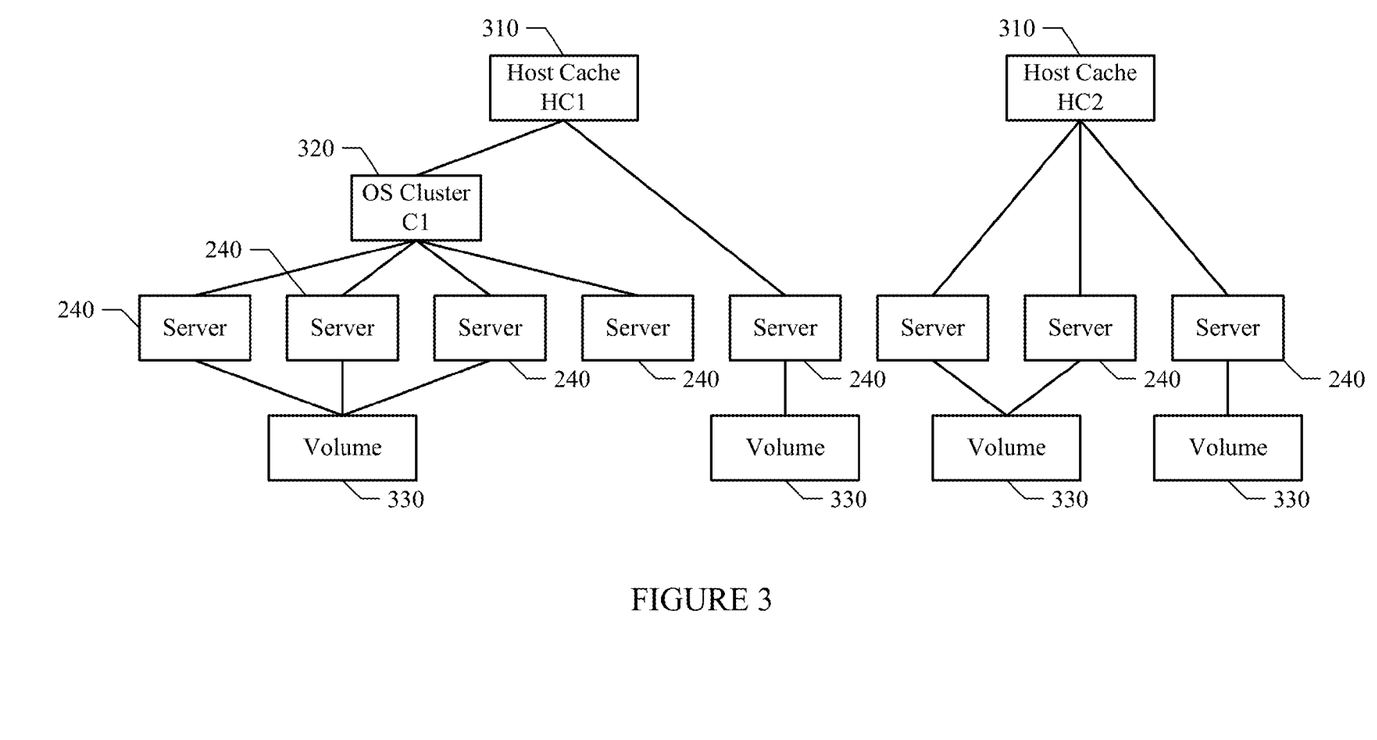
FIG. 3 illustrates example host cache objects of an example SAN.

FIG. 3 illustrates example host cache objects of an example SAN. In the example of FIG. 3, a host cache cluster may include one or more host cache objects of a SAN. A HCC is a logical concept for a group of servers operating as a host cache. SAN management may control server membership in the HCC. A HCC may connect to different SANs simultaneously.

In particular embodiments, the HCC protects against server failures and provides continued data access. Specifically, an HCC may operate in a protected write-back cache mode. In the example of FIG. 3, host cache 1 (HC1) 310 and host cache 2 (HC2) 310 are connected to one or more servers 240. Each server 240 belongs to one HCC. One or more servers 240 belong to HC1 310 while another one or more servers 240 belong to HC2 310.

Servers 240 may be clustered by operating system (OS) or by application. As illustrated in the example of FIG. 3, several servers 240 are clustered in OS Cluster C1 320. In particular embodiments, all servers of an OS cluster reside in a single HCC. In particular embodiments, an HCC may contain one or more servers running different operating systems. One or more servers 240 connect to one or more volumes 330. In particular embodiments, an OS cluster may require visibility to a volume on all servers, however, volumes may not be presented to multiple HCCs to avoid data corruption. As illustrated in HC1 310 of FIG. 3, a volume 330 may be connected to several servers 240, while other volumes 330 are connected only to server 240.

Host cache-SAN integration may control LUN access at the host cache server level. A cached LUN represents the caching instance of a volume or LUN across multiple servers. The host cache may choose to deploy cached LUN resources at its discretion. Cached LUN may have a cache mode that may change depending on its capability and the necessary performance for the data.

Particular cache modes include, but are not limited to, pass-thru (PT), write-thru (WT), write-back (WB), and WT-WB switching. PT mode may be used for initial configuration, for example. In PT mode, the host cache does not cache data for reads. In WT mode, the host cache caches data for reads and allows writes to be acknowledged by the underlying SAN. In WB mode, the host cache acknowledges writes at the host cache and tracks the dirty blocks, which may be later flushed to the SAN. In particular embodiments, the WB mode may implement the highest performance option for write workloads. WT-WB switching mode is a combination of WB and WT modes, and it may be used when the host cache does not fully support LUN snapshots stored in the cache. In WT-WB switching mode, the cache may operate in WB mode during the time when no snapshots are being taken and WT mode while taking a snapshot. WT-WB switching mode may be used to achieve improved performance between taking snapshots by operating in WB mode, and then to minimize the complexity of the cache while taking snapshots by operating in WT mode. In particular embodiments of WT-WB switching mode, a cached LUN operates in WB mode until a snapshot is taken, and then it switches to WT mode to flush the data to the SAN.

In particular embodiments the host cache controls the cache mode and determines whether WB caching of dirty data is possible. In particular embodiments, the SAN may control the cache mode in some connectivity scenarios. In particular embodiments, the SAN operates and interacts with the cache independent of which cache mode the cache is operating. For example, the SAN may have the same messages exchanged with the cache in all cache modes. In particular embodiments, interactions for a cached LUN from the SAN include connectivity and snapshots.

A HCC may require full connectivity for all cached LUNs to all servers in order to flush dirty writes to the SAN in the event of a server failure. Full connectivity allows any server to backup any other server in the cluster. In particular embodiments, HCC may not implement the forwarding of I/O from one server to another to allow for partial connectivity. The SAN is responsible for managing necessary connections. The SAN connects the Volume/LUN to each server in a HCC. This allows a cached LUN to access a volumes or LUN from any server.

A LUN or volume may be created or removed by and from the host cache. In particular embodiments, prior to the LUN being created or removed from the host cache, it must be created on the SAN. In other particular embodiments, an existing volume may be used if the SAN contains a volume without any paths connected. After a LUN is created, the SAN may attach one or more servers individually, which creates the necessary connections between the SAN and the host cache. If this fails, the LUN may be removed from the host cache. Removing a LUN from the host cache includes flushing the data to the SAN when the volume is not being deleted from the SAN. Flushing of the data may provide data completeness going forward.

In particular embodiments, SAN features, such as snapshot recovery and replication, are dependent on snapshots with a quality set of data, either crash or application consistent. Host cache-SAN snapshot integration creates consistent sets of data while letting the host cache operate in any cache mode. For example, the SAN may communicate with the host cache using a set of commands that is independent of and/or compatible with the current mode of the host cache, regardless of the mode. In some embodiments, the SAN may receive a request for a snapshot and provide confirmation when the snapshot is complete and available.

Figure 4A:
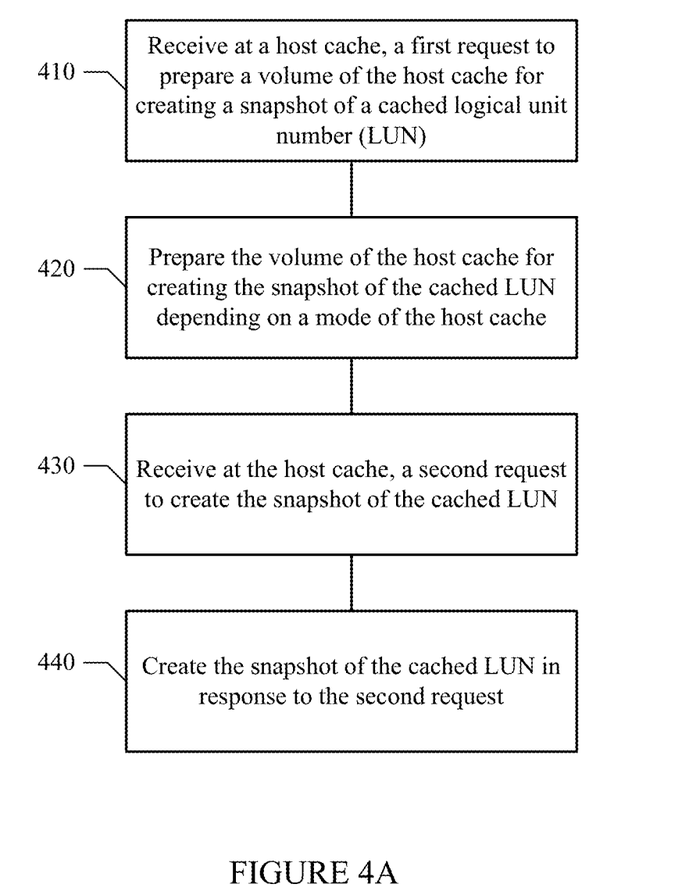
FIG. 4A illustrates an example method for coordinating a snapshot.
Figure 4B:
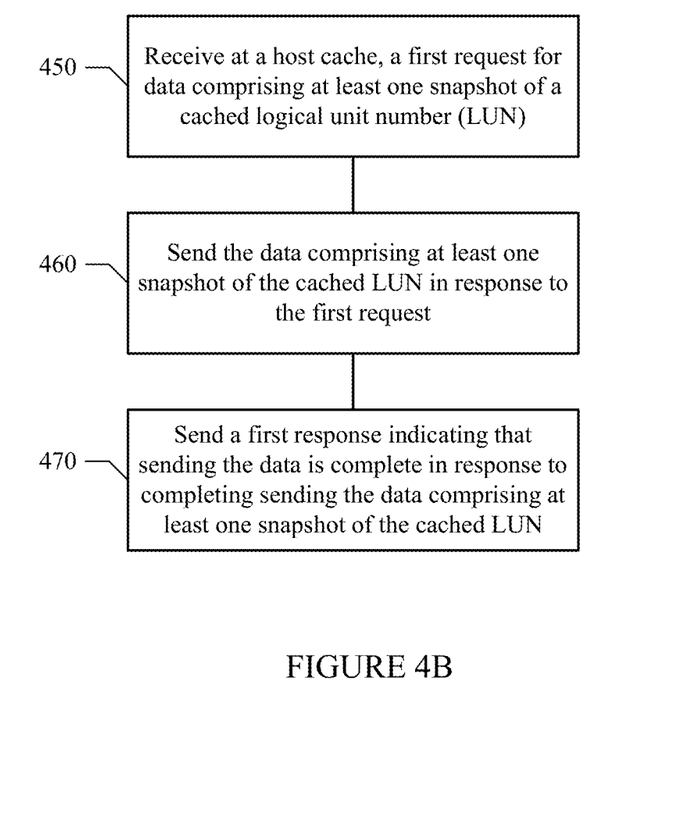
FIG. 4B illustrates an example method for flushing a snapshot.

FIGS. 4A-B illustrate example methods for snapshot creation and snapshot access, respectively. The SAN manages the snapshot creation process to allow for continued integration of SAN interfaces, such as the UI, scripts, and integrations.

In particular embodiments, the SAN may need crash or application consistent snapshots to allow for disaster recovery from a second system. In embodiments comprising a host cache and SAN, the snapshot may cover data in the SAN's storage and in the host cache, at least in some caching modes. For other caching modes, snapshots of the SAN's storage may be sufficient. When taking snapshots that cover both the host cache and the SAN, the snapshot may be stored in the host cache. When a snapshot of the SAN system is requested, for example by a client computing device, the SAN may ask the host cache to flush a snapshot stored in the host cache itself, after which the SAN can provide the full snapshot to the requestor.

Multiple snapshots may simultaneously be stored in a SAN system. In embodiments where multiple snapshots reside in a host cache, the oldest snapshots may be flushed first for the sake of efficiency and in order to produce a complete and accurate snapshot of the volume of the SAN.

In FIG. 4A, the method may start at step 410, where a host cache receives a request to prepare a volume of the host cache for creating a snapshot of a cached LUN. The prepare begins the snapshot process and handles any work of taking the snapshot that may take a long time to complete. In particular embodiments, the SAN may send a single snapshot prepare request at a time.

In step 420, the volume of the host cache prepares for creating the snapshot of the cached LUN depending on a mode of the host cache. In particular embodiments, preparing for taking the snapshot has less timing requirements than taking a snapshot, which may need to be performed quickly. In particular embodiments, for example, preparing for taking the snapshot may manage the timing of the freeze by preparing the cache so that when it is ready to create the snapshot, the snapshot freeze may happen in a brief amount of time. See Table 1 for functions of the host cache in various modes while preparing the volume for creating a snapshot:

TABLE 1

| Cache Mode | Prepare |
|---|---|
| PT | Acknowledge request |
| WT | Acknowledge request |
| WB-WT Switching | Change to WT Mode, flush cache, return response when cache flush is complete |
| WB | Acknowledge request |

In the WB-WT switching mode, it may be necessary to flush the cached LUN data to the SAN volume. This may take some time to complete, since dirty data may reside in the cache. The prepare also includes a timeout value that the cached LUN uses to wait for the freeze or cancel calls. If the timeout occurs, the cached LUN may delete the snapshot and return to the previous operating mode. The cached LUN may send a SAN snapshot cancel when it deletes a snapshot. For the WB-WT switching cache mode, the cache will be in a WT state with reduced performance. The timeout allows the cached LUN to return to WB state if a freeze or cancel is not received.

In step 430, the host cache receives another request to create the snapshot of the cached LUN. A snapshot prepare request should be followed by either a snapshot freeze request or snapshot cancel request.

In particular embodiments, the SAN will only send a single snapshot prepare or snapshot freeze request at a time. In particular embodiments, the SAN may send overlapping snapshot prepare or snapshot freeze requests. Sending multiple snapshot freeze requests to a cached LUN may allow the requests to be reordered. In particular embodiments, the SAN is allowed to send multiple prepare requests or multiple freeze requests in a row. In particular embodiments, the SAN does not need to alternate the requests between prepare and freeze. In the WB-WT switching mode, sending multiple prepare requests is additive, and a cached LUN will not switch to WB mode until a corresponding number of freeze requests is received. In particular embodiments, the SAN allows for the handling of multiple snapshots in-flight to handle the timing needs of the particular requests. In particular embodiments, holding a snapshot freeze request behind a snapshot prepare request that is being processed may cause the freeze request to timeout.

In step 440, the host cache creates the snapshot of the cached LUN in response to the another request. Particular embodiments may repeat the steps of the method of FIG. 4A, where appropriate. The freeze request creates the snapshot for the cached LUN. The freeze request must complete in a short time period because the caller may have I/O held during the request and applications may hold data until the call is completed. See Table 2 for functions of the host cache in various modes while creating the snapshot of the cached LUN:

TABLE 2

| Cache Mode | Freeze |
| --- | --- |
| PT | Send SAN snapshot flush complete to the SAN. |
| WT | Send SAN snapshot flush complete to the SAN. |
| WB-WT Switching | Send SAN snapshot flush complete to the SAN. Returns cache mode to WB. |
| WB | Create snapshot object, begin flushing snapshot data. When flush is complete send SAN snapshot flush complete to the SAN. |

The host cache sends SAN snapshot flush complete messages to the SAN to complete the movement of a snapshot to the SAN and to complete creation of the snapshot. The flush complete message is sent after all of the data is moved to the SAN. In particular embodiments, the flush complete message may arrive at the SAN before the snapshot freeze response message is received. The SAN must complete the requests properly for this timing. When the response to flush complete is received by the host cache from the SAN, regardless of success or failure, the cached LUN should delete the snapshot.

In particular embodiments, the SAN may automatically clean up objects for missed communications and error conditions. In particular embodiments, for example, if the SAN receives a flush complete message for a snapshot that is not the expected next snapshot, the SAN assumes it missed the completion of the missed snapshot and the SAN may delete the snapshot. The SAN manages the status of the all snapshots for a particular LUN. The origination of snapshot requests begins with the SAN, and passes through the host cache. The SAN applications may perform snapshots based actions as before without knowledge of host cache. In particular embodiments, a frozen snapshot exists in the host cache temporarily and once the SAN receives the snapshot, the SAN continues to manage the long term snapshot storage.

FIG. 4B illustrates an example method for flushing snapshots from the host cache to the SAN either in response to a SAN flush request or prior to completing a snapshot freeze, in response to a snapshot freeze request received from the SAN, as discussed above. In FIG. 4B, the method may start at step 450, where a host cache receives a request for data comprising at least one snapshot of a cached LUN. The SAN may then wait for a flush response.

In step 460, the host cache sends the data comprising at least one snapshot of the cached LUN in response to the request. In particular embodiments, the cached LUN may have multiple snapshots in the host cache when the flush request arrives. In particular embodiments, the process of flushing may take some time, even up to several minutes, to complete.

In step 470, the host cache sends a first response indicating that sending the data is complete in response to completing sending the data comprising at least one snapshot of the cached LUN. Particular embodiments may repeat the steps of the method of FIG. 4B, where appropriate.

Particular embodiments may make the snapshot visible to a server by flushing a snapshot from the host cache to the SAN in response to a snapshot flush request. View volume creation is the process of making a frozen snapshot visible to a server, which is not always the originating server, to allow for data access. In particular embodiments, a view volume for a frozen snapshot may be created immediately after creating the snapshot. For PT, WT and WB-WT switching, all snapshots are complete on the SAN. For fulltime WB, a snapshot's data may partially exist in the host cache. Where the snapshot data partially exists in the host cache, the flushing of a snapshot's data must complete to the SAN before the view volume is created. View volume creation may not be dependent on the host cache.

Moreover, although this disclosure describes and illustrates particular steps of the method of FIGS. 4A-B as occurring in a particular order, this disclosure contemplates any suitable steps of the method of FIGS. 4A-B occurring in any suitable order. Furthermore, although this disclosure describes and illustrates particular components, devices, or systems carrying out particular steps of the method of FIGS. 5A-B, this disclosure contemplates any suitable combination of any suitable components, devices, or systems carrying out any suitable steps of the method of FIG. 4A-B.

Figure 5A:
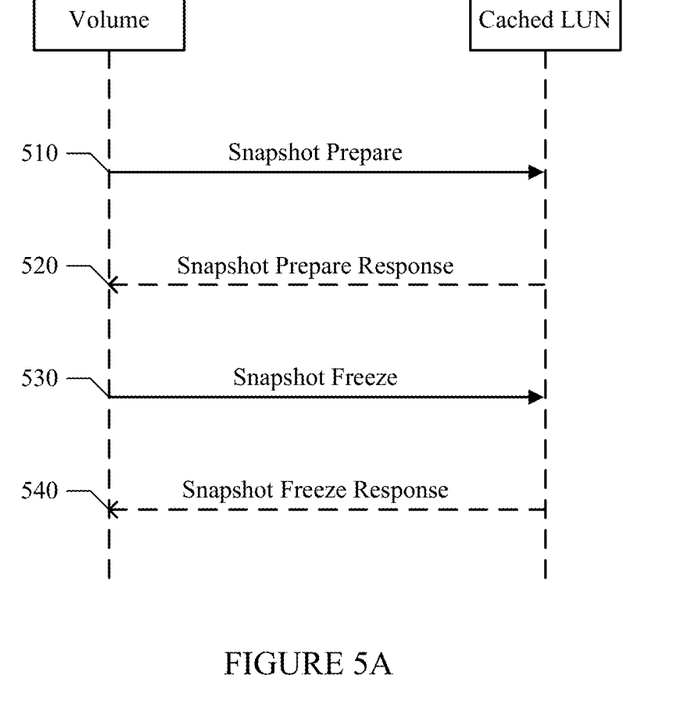
FIG. 5A illustrates an example call timeline for coordinating snapshot.

FIG. 5A illustrates a call timeline of the requests and responses that occur between the volume of the SAN and a cached LUN during snapshot creation. In call 510, the request to prepare a freeze of a snapshot is sent from the SAN to the cached LUN. The SAN calls this application programming interface (API) to coordinate the taking of a snapshot with the host cache, regardless of the cache mode. This call will be followed by a freeze snapshot, snapshot unprepare, or a snapshot cancel. The arguments for this call may include one or more of cached LUN ID, snapshot ID, or timeout. PT, WT, and WB modes have no work to perform during this operation. In the WB-WT switching mode, this call flushes the cache to the SAN so that no cache flush happens as part of snapshot freeze in order to meet the timing of the snapshot freeze.

Once the flush is complete, and the cached LUN is in WT mode, the host cache returns to the SAN, such as in call 520. In call 520, the host cache will return to the SAN success or failure return codes and debug information associated with any failure of the request. In particular embodiments, the host cache may call a SAN flush complete API. PT and WT modes call immediately to the SAN flush complete. In WB mode, the host cache must flush all data for the snapshot before the freeze. In WB-WT switching mode, if the prepare has not been sent and there is data in the cache to flush, this request may fail to meet timing limitations, and WB cache mode should be enabled. In particular embodiments, the unprepared call is not made if this succeeds.

In call 530, the SAN sends a request to the host cache to freeze a snapshot for a cached LUN. The SAN calls this API to coordinate the taking of a snapshot of the host cache, regardless of the cache mode. The arguments for this call may include cached LUN ID, snapshot ID, SAN address, SAN opaque info, automatic flush disable. Cached LUN ID is an identifier created by the host cache that allows API requests to refer to a cached LUN instance. Snapshot ID is assigned by the SAN and unique to a particular cached LUN. SAN address is the address of the SAN API to call SAN flush complete. SAN opaque info is a string of data passed through the host cache by the SAN. The SAN is responsible for managing the opaque data, including identifying it, and the host cache does not decode the opaque data.

The snapshot freeze of the host cache may complete in under one second. In call 540, once the snapshot freeze is complete, the host cache will return to the SAN success or failure return codes and debug information associated with any failure of the request.

Figure 5B:
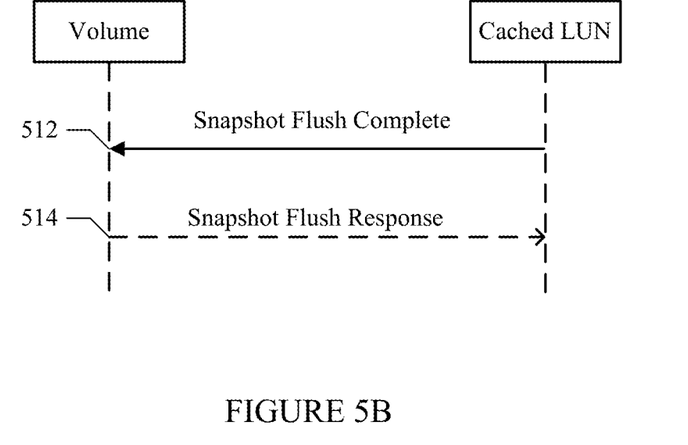
FIG. 5B illustrates an example call timeline for flushing a snapshot.

FIG. 5B illustrates a call timeline of the responses that occur between the volume of the SAN and a cached LUN while the host cache prepares for creating a snapshot. In particular embodiments, this call timeline may represent a normal operating mode of the volume of the SAN and the cached LUN. This call timeline may be used by the SAN and cached LUN to coordinate preparing the cache for creating a snapshot. In this call timeline, the SAN is not required to send a snapshot flush request to move a snapshot from the cached LUN to the volume of the SAN.

In call 512, once all of the snapshot data has been flushed from the host cache to the SAN, the host cache sends a snapshot flush complete message. The host cache originates this message to the SAN to complete the movement of the snapshot from the host cache to the SAN. Upon receiving this call, the SAN needs to make the snapshot complete. The SAN is responsible for internal routing of the snapshot flush complete to the proper volume and snapshot. The SAN must place the necessary information in the SAN opaque info passed with the snapshot freeze request to route the flush complete to the proper volume. In particular embodiments, the SAN may provide different SAN addresses for different LUNs that are being cached. If this call fails to communicate with the SAN and the retries are exhausted, the cached LUN may delete the snapshot, generate an alert, and move on with normal operations. The call arguments for call 560 may include SAN address and SAN opaque info.

In call 514, if the host cache already flushed all of the snapshot data to the SAN, the SAN returns a snapshot flush response. In particular embodiments, the snapshot flush response may include success, failure, or debug information associated with any failure of the request. In particular embodiments, if the SAN replies with failure to call 514, the host cache may delete the snapshot, generate an alert, and move on with normal operations.

Figure 5C:
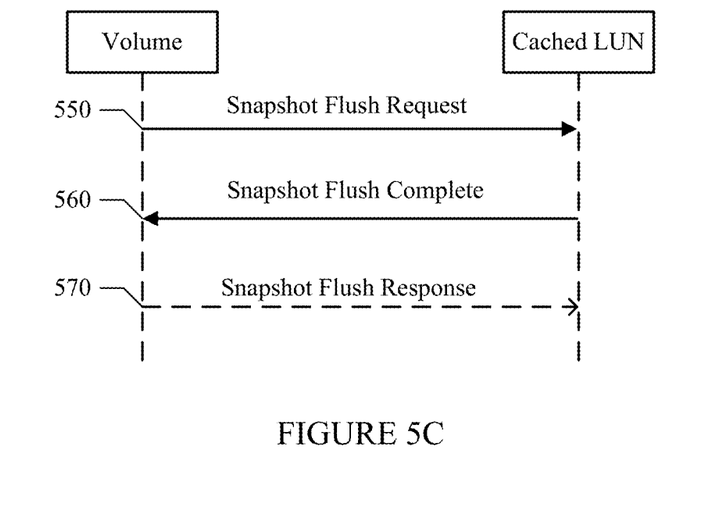
FIG. 5C illustrates another example call timeline for flushing a snapshot.

FIG. 5C illustrates a call timeline of the requests and responses that occur between the volume of the SAN and a cached LUN during flushing of the snapshots from the host cache to the SAN. This call timeline may be used by the SAN to move a cached snapshot to the SAN for view volume recovery purposes. This request may take some time to complete as it is dependent on the cache flush operations and the traffic to the SAN.

In call 550, the SAN issues a snapshot flush request to force the flushing of snapshot data to the SAN. In particular embodiments, the SAN may force a flush as needed. The SAN may send multiple flush requests for the same snapshot, which may support creating multiple simultaneous views to the same snapshot. Once the SAN receives the snapshot, it may create a view volume from the snapshot. The host cache must flush all of the data for each snapshot.

The call arguments for call 550 may include cached LUN ID and snapshot ID. Cached LUN ID is an identifier created by the host cache allowing API requests to refer to a cached LUN instance. Snapshot ID is an ID assigned by the SAN and unique to a particular cached LUN. The SAN may request multiple snapshots in the host cache for the same cached LUN. In particular embodiments, all snapshots frozen before the particular requested snapshot must also be flushed, in order, to the SAN. In particular embodiments, there may be priority to the flush for the snapshot to complete the requests out of order.

In call 560, once all of the snapshot data has been flushed from the host cache to the SAN, the host cache sends a snapshot flush complete message. The host cache originates this message to the SAN to complete the movement of the snapshot from the host cache to the SAN. Upon receiving this call, the SAN needs to make the snapshot complete. The SAN is responsible for internal routing of the snapshot flush complete to the proper volume and snapshot. The SAN must place the necessary information in the SAN opaque info passed with the snapshot freeze request to route the flush complete to the proper volume. In particular embodiments, the SAN may provide different SAN addresses for different LUNs that are being cached. If this call fails to communicate with the SAN and the retries are exhausted, the cached LUN may delete the snapshot, generate an alert, and move on with normal operations. The call arguments for call 560 may include SAN address and SAN opaque info.

In call 570, after having received the snapshot flush complete message from the host cache, the SAN assumes that the host cache flushed all of the snapshot data to the SAN and returns a snapshot flush response. In particular embodiments, the snapshot flush response may include success, failure, or debug information associated with any failure of the request. In particular embodiments, if the SAN replies with failure to call 560, the host cache may delete the snapshot, generate an alert, and move on with normal operations. The SAN may have entered an out-of-space condition and cannot complete the snapshot.

Figure 6:
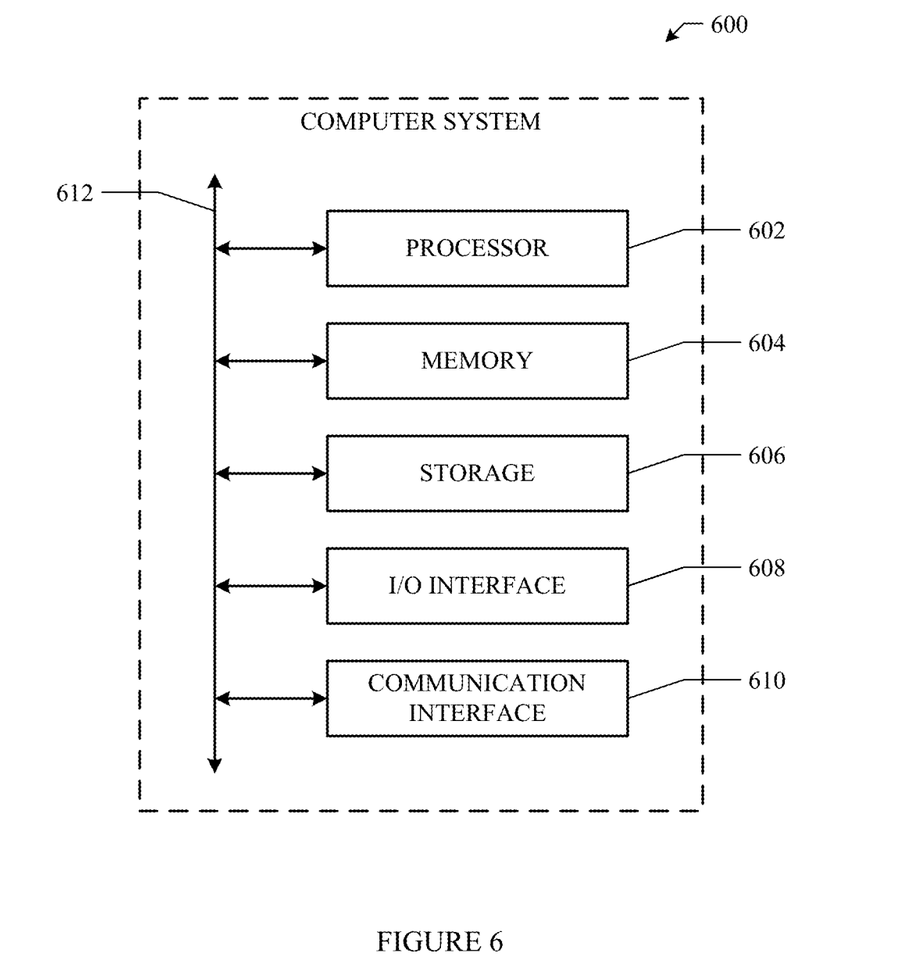
FIG. 6 illustrates an example computing system.

Particular embodiments may be implemented on one or more electronic devices or computer systems. FIG. 6 illustrates an example electronic device 600. For example, computer system 600 may be an embodiment for a device that runs a UI content editor. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The concepts disclosed in this application should not be understood to be limited to the exemplary embodiments described herein, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, performed by one or more computing devices, comprising:
   creating a logical unit number (LUN) on a SAN array;
   coupling communicatively a host cache to the SAN array, wherein non data network communications between the SAN array and the host cache are used to manage connectivity and coordinate one or more snapshot requests, wherein the non-data network communications comprises a virtual IP address interface;

creating a cached LUN at the host cache, wherein the cached LUN represents a caching instance of the LUN across a plurality of servers;

preparing a volume of the host cache for creating a first snapshot of the cached LUN, wherein preparing the volume of the host cache is dependent on a mode of the host cache, wherein the mode of the host cache comprises at least one of write-through (WT), write-back (WB), or write-back-write-through (WB-WT) switching, and wherein preparing the volume comprises:

flushing a set of data comprising at least one snapshot of the cached LUN when the host cache is in WB or WB-WT switching modes;

switching the host cache to WT mode when the host cache is in WB-WT switching mode; and sending a message indicating that the volume is prepared for creating the snapshot of the cached LUN;

creating, at the host cache, the first snapshot of the cached LUN;

receiving at the host cache a request for data comprising the first snapshot of the cached LUN;

sending, by the host cache, the data comprising the first snapshot in response to the request; and in response to completing sending the data comprising the first snapshot, sending, by the host cache, a first response indicating that sending the data comprising the first snapshot is complete.

2. The method of claim 1, wherein the data comprising the first snapshot further comprises a data map of the cached LUN that indicates how one or more data blocks of the cached LUN are associated with one or more files of the cached LUN.

3. The method of claim 1, wherein the data comprising the first snapshot further comprises a second snapshot of the cached LUN, and in response to the request, sending, by the host cache, the first snapshot and then the second snapshot.

4. The method of claim 1, further comprising sending, by the host cache, a second response that cancels sending the data comprising the first snapshot.

5. The method of claim 1, further comprising deleting, at the host cache, the data comprising the first snapshot.

6. The method of claim 1, further comprising, switching, by the host cache, from a first mode to a second mode, in response to completing the sending of the data comprising the first snapshot.

7. The method of claim 6, wherein the first mode and the second mode of the host cache comprises at least one of write-through (WT), write-back (WB), or write-back-write-through (WB-WT) switching.

8. A system comprising:
a memory comprising instructions executable by one or more processors; and the one or more processors coupled to the memory and operable to execute the instructions, the one or more processors being operable when executing the instructions to:
create a logical unit number (LUN) on a SAN array;
communicatively couple a host cache to the SAN array, wherein non-data network communications between the SAN array and the host cache are used to manage the connectivity and coordinate one or more snapshot requests, wherein the non-data network communications comprises a virtual IP address interface;
create a cached LUN at the host cache, wherein the cached LUN represents a caching instance of the LUN across a plurality of servers;
prepare a volume of the host cache for creating a first snapshot of the cached LUN, wherein preparing the volume of the host cache is dependent on a mode of the host cache, wherein the mode of the host cache comprises at least one of write-through (WT), write-back (WB), or write-back-write-through (WB-WT) switching, and wherein preparing the volume comprises:

flushing a set of data comprising at least one snapshot of the cached LUN when the host cache is in WB or WB-WT switching modes;

switching the host cache to WT mode when the host cache is in WB-WT switching mode; and sending a message indicating that the volume is prepared for creating the snapshot of the cached LUN;

creating, at the host cache, the first snapshot of the cached LUN;

receive at the host cache a request for data comprising the first snapshot of the cached LUN;

send, by the host cache, the data comprising the first snapshot in response to the request; and in response to completing sending the data comprising the first snapshot, send, by the host cache, a first response indicating that sending the data comprising the first snapshot is complete.

9. The system of claim 8, wherein the data comprising the first snapshot further comprises a data map of the cached LUN that indicates how one or more data blocks of the cached LUN are associated with one or more files of the cached LUN.

10. The system of claim 8, wherein the data comprising the first snapshot further comprises a second snapshot of the cached LUN, and the memory coupled to the processors further comprise instructions executable by the processors, the processors being operable when executing the instructions to, in response to the request, send, by the host cache, the first snapshot and then the snapshot.

11. The system of claim 8, wherein the memory coupled to the processors further comprise instructions executable by the processors, the processors being operable when executing the instructions to: send, by the host cache, a second response that cancels sending the data comprising the first snapshot.

12. The system of claim 8, wherein the memory coupled to the processors further comprise instructions executable by the processors, the processors being operable when executing the instructions to: delete, at the host cache, the data comprising the at least one snapshot.

13. The system of claim 8, wherein the memory coupled to the processors further comprise instructions executable by the processors, the processors being operable when executing the instructions to switch, by the host cache, from a first mode to a second mode, in response to completing the sending of the data comprising at least one snapshot of the cached LUN.

14. The system of claim 13, wherein the first mode and the second mode of the host cache comprises at least one of WT, WB, or WB-WT switching.

15. One or more computer-readable non-transitory storage media embodying software operable when executed by one or more computer systems to:
create a logical unit number (LUN) on a SAN array;
communicatively couple a host cache to the SAN array, wherein non-data network communication between the SAN array and the host cache are used to manage the connectivity and coordinate one or more snapshot requests, wherein the non-data network communications comprises a virtual IP address interface;
create a cached LUN at the host cache, wherein the cached LUN represents a caching instance of the LUN across a plurality of servers;
prepare a volume of the host cache for creating a first snapshot of the cached LUN, wherein preparing the volume of the host cache is dependent on a mode of the host cache, wherein the mode of the host cache comprises at least one of write-through (WT), write-back (WB), or write-back-write-through (WB-WT) switching, and wherein preparing the volume comprises:
flushing a set of data comprising at least one snapshot of the cached LUN when the host cache is in WB or WB-WT switching modes;
switching the host cache to WT mode when the host cache is in WB-WT switching mode; and
sending a message indicating that the volume is prepared for creating the snapshot of the cached LUN;
create, at the host cache, the first snapshot of the cached LUN;
receive, at the host cache, a second request to create the snapshot of the cached LUN;
receive at the host cache a request for data comprising the first snapshot of the cached LUN;
send, by the host cache, the data comprising the first snapshot in response to the request; and
in response to completing sending the data comprising the first snapshot, send, by the host cache, a first response indicating that sending the data is complete.

16. The media of claim 15, wherein the first snapshot further comprises a data map of the cached LUN that indicates how one or more data blocks of the cached LUN are associated with one or more files of the cached LUN.

17. The media of claim 15, wherein the data comprising the first snapshot further comprises a second snapshot of the cached LUN, and the one or more computer-readable non-transitory storage media is operable when executed to, in response to the request, send, by the host cache, the data comprising the first snapshot of the cached LUN and then the data comprising the second snapshot of the cached LUN.

18. The one or more computer-readable non-transitory storage media of claim 15 that is operable when executed to:
send, by the host cache, a second response that cancels sending the data comprising at least one snapshot of the cached LUN.

19. The one or more computer-readable non-transitory storage media of claim 15 that is operable when executed to:
delete, at the host cache, the data comprising the at least one snapshot.

20. The one or more computer-readable non-transitory storage media of claim 15 that is operable when executed to:
switch, by the host cache, from a first mode to a second mode, in response to completing the sending of the data comprising at least one snapshot of the cached LUN, the first mode and the second mode of the host cache comprises at least one of WT, WB, or WB-WT switching.

* * * * *